Patented Apr. 1, 1952

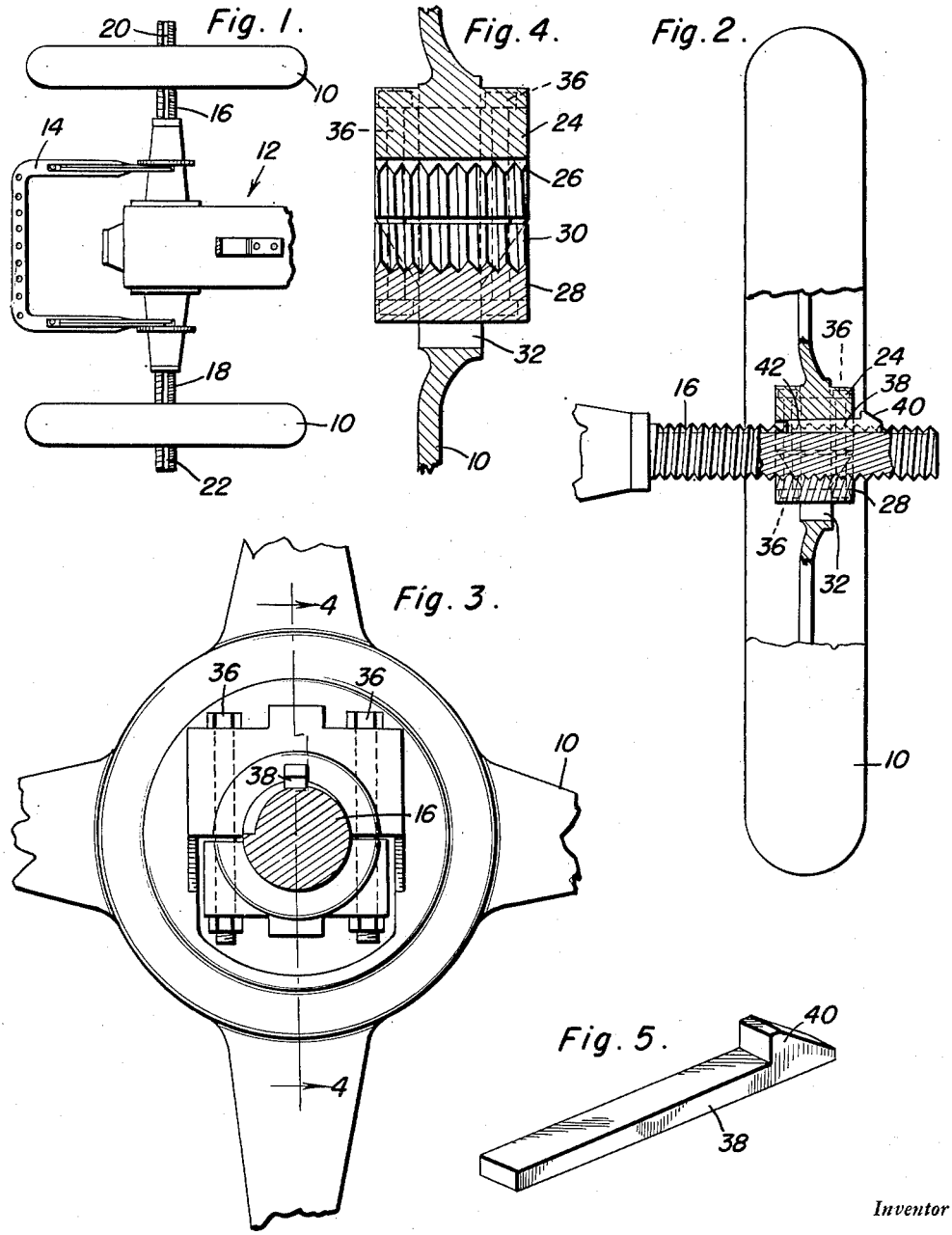

2,591,253

UNITED STATES PATENT OFFICE 2,591,253

WHEEL ADJUSTER

Martin R. Grismore, Pandora, Ohio

Application March 14, 1949, Serial No. 81,280

1 Claim. (Cl. 301—1)

This invention relates to novel and useful improvements in wheel structures for use particularly in connection with conventional tractors.

An object of this invention is to adjust the rear wheels of a tractor toward and away from the longitudinal axis of the tractor by an improved hub structure partially carried by the wheel and in part detachable from the wheel, which structure includes a hub portion having a substantially semi-cylindrical threaded surface disposed on a threaded end portion of a tractor axle and which has an opening adjacent the hub portion to accommodate the second hub portion also having a semi-cylindrical threaded surface disposed on the end threaded portion of the tractor axle, together with means holding the two hub portions together whereby, upon rotation of the wheel with respect to the axle, the wheel may be moved inwardly or outwardly with respect to the tractor.

Another object of this invention is to improve generally a wheel structure having a structure incorporated therein for moving the wheel longitudinally with respect to the supporting axle, which structure has a part of a hub cast with the wheel and another part removably fixed thereto whereby the assembly may be very easily removed, thereby permitting easy removal of the entire wheel for reversing, changing a tire, or for any other purpose.

Ancillary objects and features of novelty will become apparent to those skilled in the art, in following the description of the preferred form of the invention, illustrated in the accompanying drawings, wherein:

Figure 1 is a plan view of a fragmentary portion of a tractor having the invention applied thereto;

Figure 2 is an elevational end view of a wheel and axle assembly, portions being broken away in section to illustrate details of construction;

Figure 3 is a sectional view of a part of an axle and wheel assembly having the invention applied thereto;

Figure 4 is a sectional view taken on the line 4—4 of Figure 3 and in the direction of the arrows; and Figure 5 is a perspective view of a pin used in connection with coupling the axle to the wheel so that the tractor may operate normally.

Many attempts have been made to adjust the rear wheels of a tractor toward and away from the longitudinal axis thereof for obvious purposes in connection with farming. For one reason or another, the tried structures have been a failure insofar as commercial practicability and feasibility is concerned, as evidenced by the non-use thereof in the general field today.

In my invention, I have found that by making the hub assembly of a wheel in two pieces very easily coupled and uncoupled around an end-threaded portion of a conventional shaft of a tractor, the large difficulty of removing and applying a wheel to a tractor has been overcome and I have also found that smoothness and practicability of operation result, perhaps due to the centering of the two hub sections or portions in a plane which passes substantially through the vertical plane of the wheel.

A wheel, indicated at 10, is used as a component part of the tractor, generally indicated at 12. The usual construction, such as a drawbar 14, is shown in Figure 1 and forms no part of the present invention. This is simply a part of the conventional tractor.

The rear axle has end threaded portions 16 and 18, respectively, and keyways or slots 20 and 22, respectively, are provided in the end-threaded portions 16 and 18.

The said wheel 10 has cast or otherwise fixed thereto a hub portion or section 24 having a semi-cylindrical threaded surface 26. A complemental hub portion or section 28 also has a semi-cylindrical threaded surface 30, both surfaces being disposed on the end-threaded portion of the axle at the rear part of the tractor.

In order to accommodate the complemental hub portion 28, an opening 32 is supplied in the wheel 10 immediately opposite the fixed hub portion 24. The opening 32 is of such size as to allow easy removal and insertion of the complemental hub portion 28.

A plurality of bolts 36 are passed through both portions in order to fix them together against the end-threaded portion of the axle. Viewing Figure 3, it will be seen that a small clearance is maintained between the hub portions in order to allow the hub portions to be drawn tightly against the axle.

A key or pin 38 is disposed in the keyway of the slot 20, another key or pin identical to that shown in Figure 5 being provided for the other wheel assembly. A lug 40 is fixed with the key or pin 38 and is used for the purpose of pulling the same from the keyway and also from the slot 42 in the hub section or portion 24 which is the one that is rigid or fixed with the wheel.

In operation, the most practical manner of actuation is to lift the tractor by means of a jack and then hold the wheel while the engine is operated. When the engine is operated so that the vehicle would ordinarily travel in one direction, the wheel will be moved outwardly of the tractor. But in the opposite direction corresponding to reverse movement of the tractor, the wheel will be operated in the opposite direction. It is not recommended that the wheels be adjusted when the tractor is on the ground. However, this may be done in an emergency.

It is apparent that certain variations may be made without departing from the spirt of the invention. Accordingly, limitation is sought only in accordance with the scope of the following claim.

Having described the invention, what is claimed as new is:

For use on a vehicle which has an axle with a threaded end portion and a wheel, means for adjusting the wheel longitudinally of the axle comprising a hub portion on said wheel having a substantially semi-cylindrical threaded surface disposed on the threaded end portion of the axle, said wheel having an opening therein adjacent said hub portion, and a complemental hub portion removably carried by said first-mentioned hub portion and disposed in said opening, said complemental hub portion having a threaded surface disposed on the threaded end portion of said axle, means secured to said hub portions for removably fixing said hub portions together, one of said threaded surfaces having a slot therein extending longitudinally of the threaded end portion of the axle, said slot being tapered with the deeper part thereof opening through the end of said hub portion having said slot and said end of said hub portion being on the outside surface of the wheel, said threaded end portion of said axle being provided with a slot arranged to register with the first mentioned slot, and a pin insertable in said slots from the outside surface of the wheel to hold said hub portions releasably coupled to the threaded end portion of the axle.

MARTIN R. GRISMORE.

REFERENCES CITED

The following references are of record in the file of this patent:

UNITED STATES PATENTS

| Number | Name | Date |
|---|---|---|
| 395,572 | Lomont | Jan. 1, 1889 |
| 610,576 | Auger | Sept. 13, 1898 |
| 955,994 | Raifsnyder | Apr. 26, 1910 |
| 1,339,852 | Lockhart | May 11, 1920 |
| 1,656,935 | Bahan | Jan. 24, 1928 |
| 2,235,457 | Lorimor | Mar. 18, 1941 |
| 2,324,681 | Dekker | July 20, 1943 |
| 2,546,453 | Koenig | Mar. 27, 1951 |